United States Patent Office 3,227,729
Patented Jan. 4, 1966

3,227,729
SUCCINIMIDO [3,4-b]-3a,4,5,6-TETRAHYDROACE-
NAPHTHEN-10-ONES
Ernest E. Campaigne, 1240 E. Wylie St., Bloomington,
Ind., and Wendell L. Roelofs and Richard F. Weddle-
ton, Bloomington, Ind.; said Roelofs and said Wed-
dleton assignors to said Campaigne
No Drawing. Filed Apr. 7, 1964, Ser. No. 358,091
8 Claims. (Cl. 260—326.3)

This invention relates to novel compounds. More particularly, this invention relates to novel compounds which possess valuable therapeutic utility as anticonvulsant agents.

It is an object of this invention to provide a new class of therapeutic compounds. It is another object of the present invention to provide novel compounds having anticonvulsant activity.

These and other objects which may appear as the specification proceeds are achieved by this invention which comprises the provision of compounds having the following formula

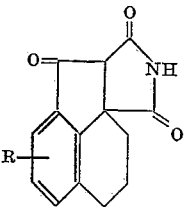

and the pharmaceutically acceptable nontoxic salts thereof. In the formula, R is hydrogen, chloro, bromo, iodo, fluoro, trifluoromethyl, lower alkyl, lower alkoxy, lower alkanoyl or lower alkanoyloxy.

The pharmaceutically acceptable nontoxic salts of the compounds of this invention include the nontoxic metallic salts such as sodium, potassium, calcium, aluminum and the like.

The term "lower alkyl" as used herein means both straight and branched chain aliphatic hydrocarbon radicals having from 1 to 8 carbon atoms such as methyl, ethyl, propyl, isopropyl, butyl, isobutyl, t-butyl, amyl, hexyl, 2-ethylhexyl and the like.

Similarly, where the term "lower" is used as part of the description of another group, e.g., "lower alkoxy," it refers to the alkyl portion of such group which is therefore as described in connection with "lower alkyl."

The novel compounds of this invention have been found to possess significant anticonvulsant action. Thus, they are useful for controlling various types of convulsant seizures.

The compounds of the present invention were tested for anticonvulsant activity by the electroshock test in which an anticonvulsant protects the mice against the effects of administered electroshocks. When the preferred compound of this invention, succinimido[3,4-b]-3a,4,5,6-tetrahydroacenaphten-10-one, was administered orally to mice and the mice were subjected to electroshock, the $ED_{50}$ vs. electroshock convulsions was found to be 35.4 mg. kg. This indicates that succinimido [3,4,-b]-3a,4,5,6-tetrahydroacenaphthen - 10 - one is an active anticonvulsant.

The compounds of this invention are prepared by the following series of reactions.

(1) A 1-tetralone (1,2,3,4-tetrahydronaphthalene-1-one) of the formula

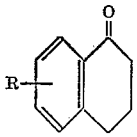

wherein R is as represented above, and attached to the 5-, 6- or 7-position, is reacted with malononitrile according to the method described by D. T. Mowry, J. Am. Chem. Soc., 67, 1050 (1945), to produce an α-tetrylidenemalononitrile. This reaction may be represented as follows:

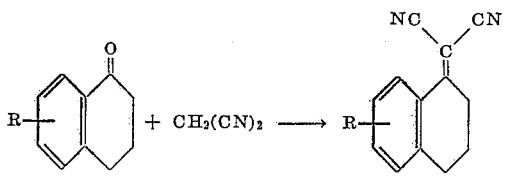

(2) The α-tetrylidenemalononitrile prepared by Reaction 1 is cyclized to 2-carbamoyl-3,4-trimethyleno-1-indenone by warming in concentrated sulfuric acid for a short period of time, and then cooling and quenching over ice, according to the method described by E. Campaigne and G. F. Bulbenko, J. Org. Chem., 26, 4703 (1961), and E. Campaigne, G. F. Bulbenko, W. E. Kreighbaum, and D. R. Maulding, J. Org. Chem., 27 (1962). This reaction may be represented as follows:

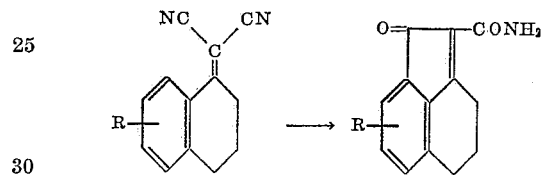

(3) The 2 - carbamoyl - 3,4-trimethyleno-1-indenone prepared by Reaction 2 is treated with a cyanide, e.g., sodium cyanide in an inert solvent, e.g., aqueous t-butanol, according to the method described by C. F. Koelsch, J. Org. Chem., 25, 2088 (1960), to form 3,4-trimethyleno-3-cyano-2-carboxamidohydrindone. This reaction may be represented as follows:

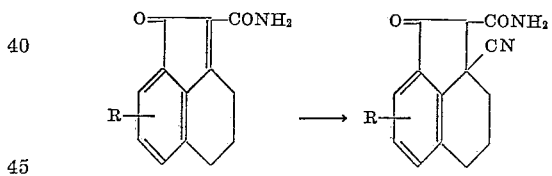

(4) The 3,4-trimethyleno-3-cyano - 2 - carboxamidohydrindone prepared by Reaction 3 is treated with a concentrated inorganic acid, e.g. sulfuric acid, hydrochloric acid, hydrobromic acid and the like, but preferably sulfuric acid, at a temperature not exceeding 40° C. followed by quenching in ice-water to give 2,2a-dicarboxamido-2a,3,4,5 - tetrahydroacenaphthen - 1-one. This reaction may be represented as follows:

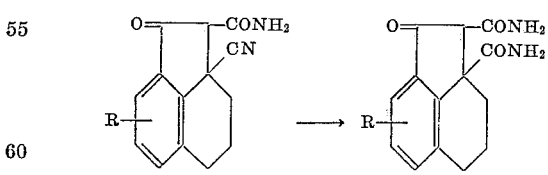

(5) The 2,2a-dicarboxamido-2a,3,4,5 - tetrahydroacenaphthen-1-one, prepared by Reaction 4 is converted to the desired product, succinimido[3,4-b]-3a,4,5,6-tetrahydroacenaphthen-10-one by heating an acidified diethylene glycol solution of the compound at 120–130° C. for one-half hour, and then poured into ice water to crystallize the desired product, succinimido[3,4-b]-3a,4,5,6 - tetrahydroacenaphthen - 10 - one. Acids which may be used include sulfuric acid, hydrochloric acid, hydrobromic acid and the like, but sulfuric acid is preferred. Diethylene glycol may be replaced by any other organic solvent, e.g. ethylene glycol, diethylene glycol and the like. This reaction may be represented as follows:

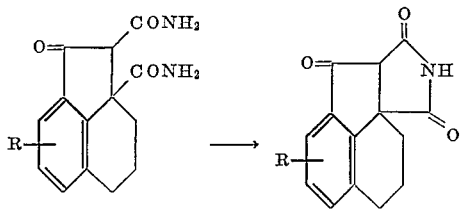

Alternatively, the product of Reaction 3 can be converted directly to the desired product of Reaction 5 by treating the 3,4-trimethyleno-3-cyano-2-carboxamidohydrindone with an acid, e.g. sulfuric acid, hydrochloric acid, hydrobromic acid and the like. However, it is more advantageous to carry out the reaction in two steps, i.e., Reactions 4 and 5.

The α-tetralones used as starting materials to prepare the compounds of this invention are either well known in the prior art, or easily prepared in accordance with standard organic procedures previously described in the chemical literature.

The compounds of this invention may be administered as the free bases or in the form of their nontoxic salts. They may be compounded and formulated into pharmaceutical preparations for oral or parenteral administration with organic or inorganic solid materials or liquids which are pharmaceutically acceptable carriers. The compositions may take the form of tablets, powder granules, capsules, suspensions, solutions and the like. Such compositions are considered within the scope of this invention.

The following examples are intended to illustrate the invention herein described without unduly restricting it.

EXAMPLE 1

*Preparation of α-tetrylidenemalononitrile*

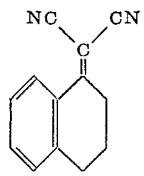

A 500 ml. round-bottomed flask was charged with 73.0 gm. (0.5 mole) of 1-tetralone, 33.0 gm. (0.5 mole) of malononitrile, 200 ml. of benzene, 4.0 gm. ammonium acetate, and 12 ml. of glacial acetic acid. The solution was refluxed vigorously for 7 hours, water being removed by a Dean and Stark trap. Evaporation of the benzene left a dark residue which crystallized from 95% ethanol to yield 70–80% of colorless needles, M.P. 95–105° C. Further crystallization from 95% ethanol gave colorless crystals, M.P. 109–110° C.

EXAMPLE 2

*Preparation of 2-carbamoyl-3,4-trimethyleno-1-indenone*

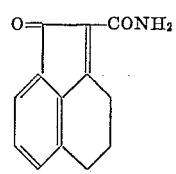

A solution of 20.0 gm. (0.1 mole) of α-tetrylidene-malononitrile in 100 ml. of concentrated sulfuric acid was warmed on a steam bath until the color became deep burgundy red (about 5 minutes was required). The solution was then cooled to room temperature and poured into 500 gm. of ice with stirring. The black, tarry-appearing aqueous solution, after standing overnight, deposited orange crystals of 2-carbamoyl-3,4-trimethyleno-1-indenone. The crude product (17 gm., 80%) melted at 185–189° C. with decomposition. Recrystallization from methanol gave fine long needles of intense orange-gold color which decomposed in the range of 203–205° C.

EXAMPLE 3

*Preparation of 3,4-trimethyleno-3-cyano-2-carboxamidohydrindone*

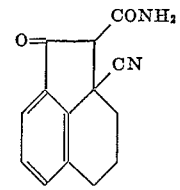

A mixture of 5.0 gm. (0.025 mole) of 2-carbamoyl-3,4-trimethyleno-1-indenone, 20 ml. of water, 7 ml. of t-butanol, and 2.0 gm. (0.041 mole) of sodium cyanide was heated on a steam bath with stirring until a homogeneous dark red solution was obtained (about 5 minutes). The solution was allowed to stand at room temperature for three hours, cooled to 0° C., diluted to 250 ml. with water and acidified with 20% aqueous sulfuric acid, yielding 5.5 gm. (100%) of a yellow precipitate, M.P. 202–205° C. with decomposition. The yellow precipitate (in KBr) exhibits infrared absorption maxima at the following frequencies: 3400 ($NH_2$); 2020 ($C\equiv N$); 1720 (CO); 1650 (amide CO); 1600 ($C=C$) cm.$^{-1}$; and the ultraviolet absorption spectra (in $C_2H_5OH$) is as follows:

$$\lambda_{max}^{C_2H_5OH} \ (m\mu/\epsilon): 256/10{,}100; \ 297/2{,}700$$

*Analysis.*—Calc'd. for $C_{14}H_{12}N_2O_2$: C, 69.98; H, 5.04; N, 11.75; M.W. 240.26. Found: C, 70.17; H, 5.22; N, 11.78; M.W. 242.0.

EXAMPLE 4

*Preparation of 2,2a-dicarboxamido-2a,3,4,5-tetrahydroacenaphthen-1-one*

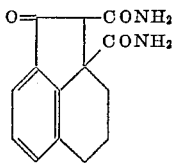

A quantity of 50.0 gm. (0.208 mole) of 3,4-trimethyleno-3-cyano-2-carboxamidohydrindone was added in portions to 200 ml. of concentrated sulfuric acid with stirring and the temperature maintained below 40° C. by intermittent cooling in an ice bath. After the addition was complete (about 15 minutes), the solution was stirred at room temperature until a homogeneous orange solution was obtained (about 1.5 hours), poured into 2 liters of ice water with stirring and left to settle overnight, yielding 52.6 gm. (98%) of a white percipitate, M.P. 233–234° C. with decomposition. A sample recrystallized from ethanol melted at 239–240° C. The white precipitate (in KBr) exhibits infrared absorption maxima at the following frequencies: 3448, 3390 ($NH_2$); 3155 ($NH_2$); 1718 (CO); 1695, 1640 (amide CO) cm.$^{-1}$.

*Analysis.*—Calc'd. for $C_{14}H_{14}N_2O_3$: C, 65.10; H, 5.46; N, 10.85. Found: C, 64.47; H, 5.37; N, 10.71.

EXAMPLE 5

*Preparation of succinimido[3,4-b]-3a,4,5,6-tetrahydroacenaphthen-10-one*

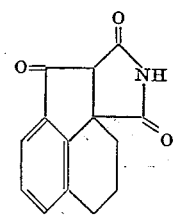

To a slurry of 52.6 gm. (0.203 mole) of crude 2,2a-dicarboxamido-2a-3,4,5-tetrahydroacenaphthen-1-one in 450 ml. of diethylene glycol was added with stirring 10 ml. of concentrated sulfuric acid. The mixture was heated on a hot plate with stirring until a homogeneous orange solution was obtained (at about 110° C.) then heated at 120–130° C. for 30 minutes, poured into 5 liters of ice-water with stirring and left overnight to settle, yielding 46.0 gm. (94%) of a white powder, M.P. 245–247° C. One recrystallization from 95% ethanol (about 1.5 liters) gave 32.5 gm. of colorless plates, M.P. 253–255° C. The colorless plates (in KBr) exhibit infrared absorption maxima at the following frequencies: 3220, 3150 (NH); 3030 (CH); 1760, 1710 (CO) cm.$^{-1}$; and ultraviolet absorption spectra (in $C_2H_5OH$) is as follows:

$\lambda_{max.}^{C_2H_5OH}$ (m$\mu$/$\epsilon$): 262/10,900; 305/2,460

*Analysis.*—Calc'd. for $C_{14}H_{11}O_3N$: C, 69.75; H, 4.60; N, 5.81. Found: C, 69.75; H, 4.65; N, 5.80.

EXAMPLE 6

When, in the above procedures, 1-tetralone is replaced by 5-chloro-1-tetralone,
6-iodo-1-tetralone,
7-bromo-1-tetralone,
6-trifluoromethyl-1-tetralone,
5-methyl-1-tetralone,
5-methoxy-1-tetralone,
5-acetyloxy-1-tetralone,
6-fluoro-1-tetralone,
5-ethyl-1-tetralone,
7-isopropyl-1-tetralone,
6-propionyloxy-1-tetralone,
6-acetyl-1-tetralone,
5-fluoro-1-tetralone and
6-chloro-1-tetralone, the following compounds are produced,

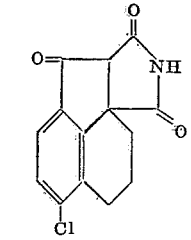

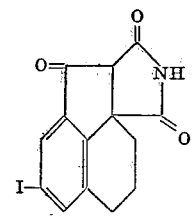

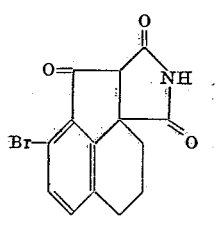

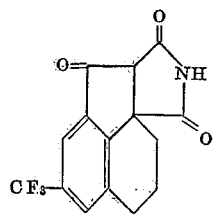

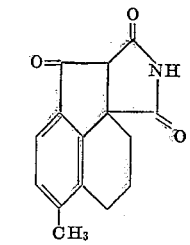

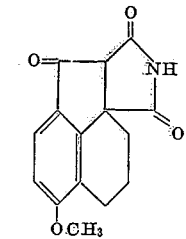

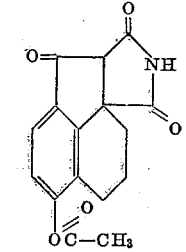

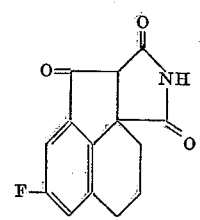

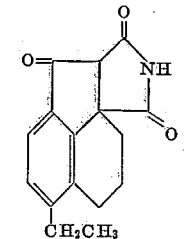

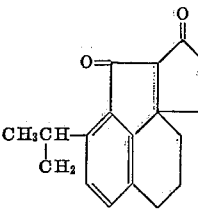

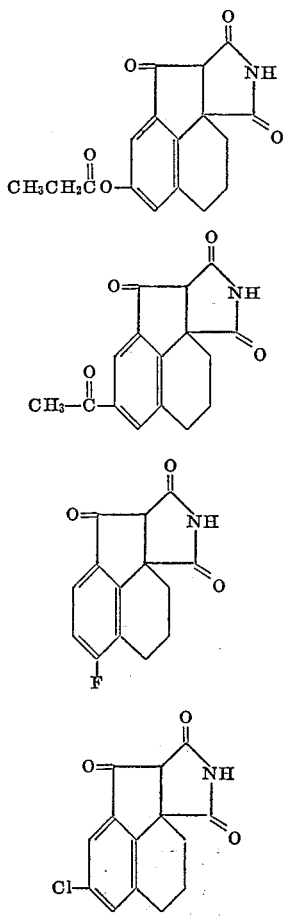

While this invention has been described and exemplified in terms of its preferred embodiment, those skilled in the art will appreciate that modifications can be made without departing from the spirit and scope of this invention.

What is claimed is:

1. A compound selected from the group consisting of compounds of the formula

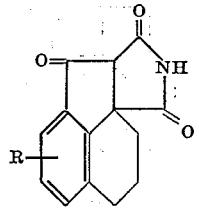

wherein R is a member selected from the group consisting of hydrogen, chloro, bromo, iodo, fluoro, trifluoromethyl, lower alkyl, lower alkoxy, lower alkanoyl, and lower alkanoyloxy; and the pharmaceutically acceptable nontoxic salts thereof.

2. A compound of the formula

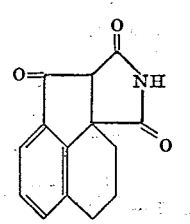

3. A pharmaceutically acceptable nontoxic salt of the compound having the formula

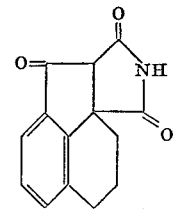

4. A compound of the formula

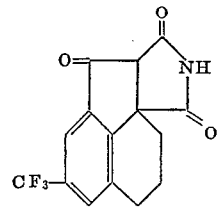

5. A compound of the formula

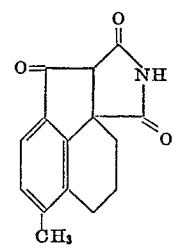

6. A compound of the formula

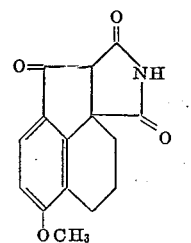

7. A compound of the formula

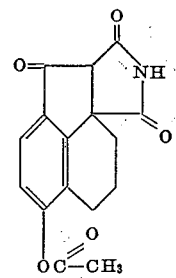

8. A compound of the formula

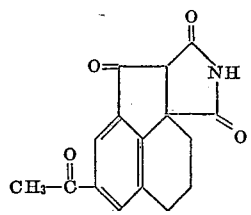

No references cited.

NICHOLAS S. RIZZO, *Primary Examiner.*